United States Patent
Hanson et al.

(10) Patent No.: US 7,164,762 B2
(45) Date of Patent: Jan. 16, 2007

(54) ENHANCED CALL FEATURE SERVICE (75) Inventors: Karrie J. Hanson, Westfield, NJ (US); Gerald M. Karam, Morristown, NJ (US); Eric Cheung, New York, NY (US); Healfdene H. Goguen, South Orange, NJ (US); Kermit Hal Purdy, Bernardsville, NJ (US)

(73) Assignee: AT&T Corp., New York, NY (US)

( * ) Notice: Subject to any disclaimer, the term of this patent is extended or adjusted under 35 U.S.C. 154(b) by 164 days.

(21) Appl. No.: 10/951,351

(22) Filed: Sep. 27, 2004

(65) Prior Publication Data

US 2005/0074111 A1  Apr. 7, 2005

Related U.S. Application Data (60) Provisional application No. 60/507,542, filed on Oct. 1, 2003.

(51) Int. Cl.
*H04M 3/42* (2006.01)
(52) U.S. Cl. ................ 379/212.01; 379/88.01
(58) Field of Classification Search ..................... None
See application file for complete search history.

(56) References Cited

U.S. PATENT DOCUMENTS

| | | | |
|---|---|---|---|
| 5,958,016 A | 9/1999 | Chang et al. | |
| 6,160,883 A | 12/2000 | Jackson et al. | |
| 6,161,134 A * | 12/2000 | Wang et al. | 709/220 |
| 6,185,285 B1 | 2/2001 | Relyea et al. | 379/207 |
| 6,404,878 B1 | 6/2002 | Jackson et al. | |
| 6,532,286 B1 | 3/2003 | Burg | |
| 6,535,730 B1 * | 3/2003 | Chow et al. | 455/416 |
| 6,631,186 B1 | 10/2003 | Adams et al. | |
| 6,956,850 B1 * | 10/2005 | Fourie et al. | 370/360 |

FOREIGN PATENT DOCUMENTS

| | | |
|---|---|---|
| EP | 1 081 932 A1 | 3/2001 |
| WO | 98/53591 | 11/1998 |

* cited by examiner

Primary Examiner—Creighton Smith
(74) Attorney, Agent, or Firm—Hoffmann & Baron, LLP (57) ABSTRACT

The present invention provides a system and method for managing calls for a subscriber, including accessing a calling plan while the subscriber is in an existing active call with at least one other party. The call is placed or received by the subscriber at a first device. At least one service feature of the calling plan is invoked during the active call. This service feature includes an add callers feature for adding at least one additional party to the existing active call between the subscriber and the other party. The service feature additionally includes a transfer devices feature for transferring the existing active call to at least one additional device of the subscriber and hanging up on the first device by the subscriber to confirm the transfer of the call to the additional device.

24 Claims, 5 Drawing Sheets

| Network Elements | Signaling Interface |
| --- | --- |
| TA – ASX | MGCP |
| TA <–> Vplus AS | RTP (2-way) |
| TA<–>GSX | RTP (2-way) |
| Media Server ->TA | RTP (1-way) |
| ASX – PSX | Sonus Diameter+ |
| ASX – GSX | SIP |
| ASX – Media Server (SnowShore) | SIP |
| ASX – VPlus AS | SIP |
| ASX - DNS (SAS-VP) | DNS query UDP |
| GSX – PSX | Sonus Diameter+ |
| VPlus AS – PSX | SIP |
| VPlus AS – GSX | SIP, RTP |
| VPlus AS – Conference Server | MGCP |
| VPlus AS – VoiceXML Server | SIP |
| GSX – LNS Switch | NI 2 , PRI |
| LNS Switch – 4ESS | SS7 |
| LNS Switch – ILEC Switch | SS7 or MF |
| TA – Provisioning Server (SAS-VP) | HTTP XML |
| TA – TFTP Server (SAS-VP) | TFTP |
| TA – PPPoE Server | PPPoE |

FIG. 3

Non VPlus subscriber ASX to PSTN

ENHANCED CALL FEATURE SERVICE

CROSS REFERENCE TO RELATED APPLICATIONS

This Application claims priority to U.S. Provisional Patent Application No. 60/507,542 filed on Oct. 1, 2003, which is herein incorporated by reference in its entirety.

FIELD OF THE INVENTION

The present invention relates to telephony services and, more particularly, to enhanced telephony services for call management.

ACRONYMS

The following is a list of acronyms used in the body of the specification and their definitions, which shall apply throughout the specification unless otherwise noted.
ADS access directory server
AMA automatic message accounting
API application programming interface
ASX application server exchange
CPU central processing unit
DAD data access device
DHCP dynamic host configuration protocol
DN directory number
DSI data stream integrator
DSL digital subscriber line
DTMF dual tone multi-frequency
DVD digital video disk
FC-AL fiber channel arbitrated loop
FQDN fully qualified domain name
GS group server
GSX gateway server exchange
HSD high speed data
HTTP hyper text transfer language protocol
LAD integrated access device
IVR interactive voice response
ILEC independent local exchange carrier
INMS integrated network management system
IP internet protocol
ISDN integrated services digital network
LAN local area network
LD long distance
LNS local network services
MGCP multimedia gateway control protocol
NPA numbering plan area
NANP North American numbering plan
PIN personal identification number
PPPoE point-to-point protocol over ethernet
PRI primary rate interface
PSTN Public Switched Telecommunications Network
PSX policy server exchange
ROM read only memory
RTP real time transfer protocol
SG service group
SIP session initiation protocol
SPS service provisioning system?
SS7 signaling system 7 (telephony protocol)
TA terminal adaptor
TDM time division multiplexer
TFTP trivial file transfer protocol
TN telephone network
UTP universal telephony platform
VoIP voice over internet protocol
VPLUS an advanced application server
XML extensible markup language

BACKGROUND OF THE INVENTION

The availability of various communication system networks has been increasing exponentially over the past decade. Among these networks are the conventional wired Public Switched Telephone Network (PSTN), packet switched data networks such as the Internet, wireless satellite networks and the like. The increased availability of these communication system networks provides opportunities and needs for enhanced information management related to use of these networks.

Presently, subscriber services available to users of these networks are usually administered by a control center having access only to a particular communication network or group of networks. To access these subscriber services, a subscriber must call a customer service representative or interact with an interactive voice response (IVR) system using a standard dual tone multi-frequency (DTMF) telephone device. However, a subscriber may want to manage information flow without having to first access a call agent at the control center or to manage information flow outside the control center network. Accordingly, it would be advantageous for a user to be able to provision and invoke various services without having to be associated with a particular control center or be limited to a particular network or networks.

A user, also referred to herein as a subscriber, may want to manage information flow and access among his multiple communication devices. For example, a subscriber, while call with a first party, may want to add callers to the call. In this instance, it would be advantageous for the subscriber to have options, such as adding additional calls to the ongoing call, or permitting a caller to leave a voice mail message when the subscriber is on the ongoing call. Alternatively, a subscriber may want to switch an ongoing call from one device to another.

In one known telephonic service, a call waiting option is available in which a subscriber who is on a call with a first party may be alerted to the presence of an incoming call by another party. In this known service, a subscriber is alerted by a tone to the presence of an incoming call by a second party. The subscriber may choose to accept the incoming call by pressing the off hook on the telephone. The first party is then placed on hold while the subscriber accepts the incoming call from the second party. The subscriber may be reconnected to the first party by pressing the off hook again. However, this service is not controllable by the user. There is not an option, for example, to prevent the interruption when the user is on an important call. Additionally, in the known call waiting service feature, it is not possible to allow the second party to join the call.

It would be advantageous, for example, if a subscriber could perform call management functions, whereby the subscriber is able to manage, and to direct the use and configuration of such service at will, without first having to go through a service representative or wait for selected service features to be activated.

It would also be advantageous for a subscriber to be able to manage incoming calls, and in particular to add one or more additional callers or to switch devices, while on an ongoing call.

SUMMARY OF THE INVENTION

The present invention provides a method for managing calls for a subscriber comprising: accessing a calling plan while the subscriber is in an existing active call with at least one the other party, where the call is placed or received by the subscriber at a first device. The method further includes invoking at least one service feature of the calling plan during the active call. The said feature includes, an add callers feature for adding at least one additional party to the existing active call between the subscriber and the other party and a transfer devices feature for transferring the existing active call to at least one additional device of the subscriber and hanging up on the first device by the subscriber to confirm the transfer of the call to the additional device.

Also provided is a system architecture for implementing the method of the present invention which takes advantage of packet-switched telephony across a high-speed data network. The system manages calls for a subscriber where a call is placed or received by the subscriber. The system includes an internet protocol network connected to a first device of the subscriber at least one gateway connected to at least one other party, at least one platform connected to the gateway and the internet protocol network for accessing a calling plan with at least one service feature while the subscriber is in an existing active call with the other party. The feature includes an add callers feature for adding at least one additional party to the existing active call between the subscriber and the other party and a transfer devices feature for transferring the existing active call to a at least one additional device of the subscriber and hanging up on the first device by the subscriber to confirm the transfer of the call to the additional device.

DETAILED DESCRIPTION OF THE PREFERRED EMBODIMENTS

A call management service feature according to the invention permits a subscriber to activate various advanced call service features while in the middle of a call. When the subscriber is on an active two party call, the subscriber invokes the features mid-call by pressing a wake-up sequence (preferably 3 stars on the touchtone keypad), pressed in rapid succession. A distinctive sequence of touchtones is used to minimize the possibility of accidental engagement during sessions with far-party interactive voice response (IVR) systems.

It is preferable to use one wake-up sequence for all such features, and the ensuing IVR dialog allows the subscriber to select the desired feature to apply. The subscriber can choose from features such as adding some number of additional parties to the existing call and/or moving the call while still in progress to another device, whether the subscriber was the original calling or called party. Preset locations, and labels for the other parties or for the other locations, can be provisioned by the subscriber. The services provided in these features are described in detail below.

Figure 1:
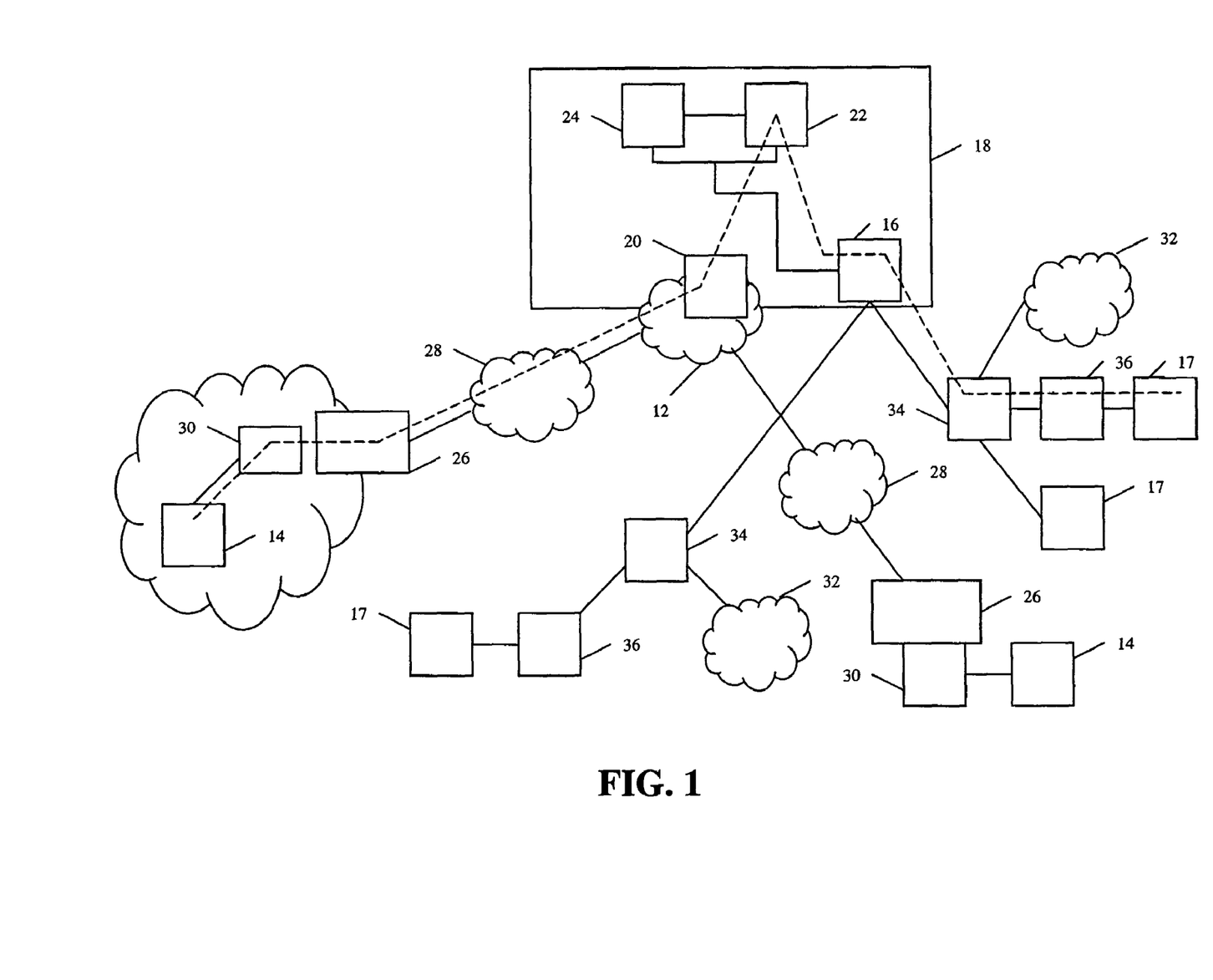
FIG. 1 is a block diagram of system architecture representing an embodiment of the present invention.

Furthermore, a service architecture is disclosed for implementing the enhanced call service features as described herein below Service Architecture Referring to the drawings, FIG. 1 shows one embodiment of a system 10, which is suitable for implementation of the call management method of the present invention. System 10 includes an internet protocol network 12 connected to a first device 14 of a subscriber. System 10 further includes at least one gateway 16 connected to a device 17 of another party already in an existing call with the device 14 of the subscriber. The system also includes a platform 18, preferably a VoIP platform connected to gateway 16 and the network 12 for accessing a calling plan with at least one service feature while the subscriber at the first device 14 is in an existing call with the device 17 of another party. The features include an add callers feature for adding at least one additional party to the existing active call between the subscriber and another party, and a transfer devices feature for transferring the existing active call to at least one additional device of the subscriber and hanging up on the first device by the subscriber to confirm the transfer of the call to the additional device. The gateway 16 is connected to the devices 17 of the additional party to alert the devices of the existing active call and further connecting the device 14 of the subscriber to the additional party to form a new call leg. The network is connected to the additional devices 17 of the subscriber to alert the additional device 17 of the existing active call and further connecting the subscriber to the additional device to form a new call leg. Platform 18 is connected to network 12 desirably through a fast router 20. Platform 18 can include of a variety of servers. In a preferred embodiment, platform 18 includes at least one application server 22, within which resides the service logic necessary to implement the enhanced call notification method of the present invention. Application Server 22 has voice over internet capabilities. Routing and policy information can optionally be stored in additional servers, such as policy server 34.

Figure 2:
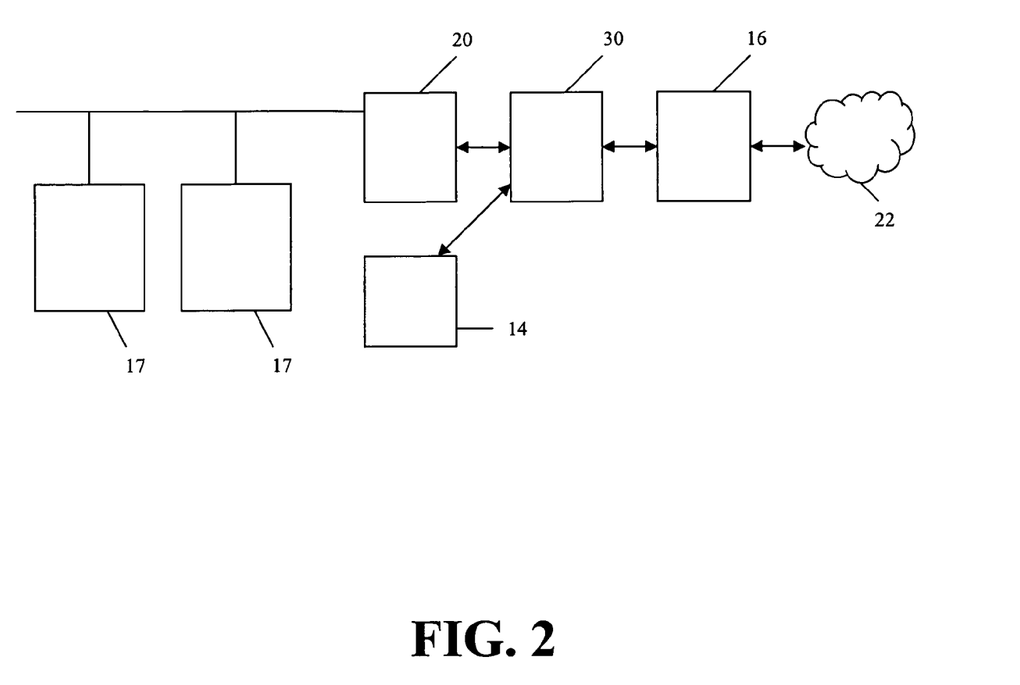
FIG. 2 is a block diagram with a schematic representation of components in one embodiment of a system of the present invention.

A subscriber is assumed to have access through some form of access device 26 to a high speed data (HSD) network 28. For example, the subscriber is assumed to have a broadband connection to a broadband access network, provided through a cable or digital subscriber line (DSL) modem. It is preferable that the subscriber have at least 128 Kbps upstream bandwidth. The subscriber connects their telephone via an RJ-11 jack (not shown) preferably into a terminal adaptor 30 (TA). The TA connects to the subscriber's cable or DSL modem. The use of the TA can ensure that the subscriber's data packets do not degrade the voice quality-of-service. FIG. 2 is a more detailed view of how the TA may be adapted for connection to a modem and a home network. Alternatively, and without limitation, end device 14 itself can be a modified integrated access device that connects directly to the modem or the broadband network. Alternatively, and without limitation, the telephone can be a telephony client executed on a data access device, such as a personal computer. It is assumed that the called party also has access through the same access device or a separate access device to data services, such as a Web browser.

The high speed data network 28 provides access to the service provider's internet protocol network 12, such as AT&T's Internet Protocol (IP) Common Backbone Network (CBB). The backbone network is used for call setup signaling and network management. The backbone network is also used to carry the RTP stream to the telephony gateway.

The illustrative VoIP platform 18 is depicted in FIG. 1 and is connected to network 12 illustratively through a fast router 20. The platform can be illustratively composed of a variety of servers connected via a high speed local area network using Ethernet switches (ES) and/or routers to provide access/networking to network 12. The platform has a network gateway border element 18 to a legacy telephone network, e.g. to a long distance network 32 in the Public Switch Telephone Network (PSTN). For example, as shown in FIG. 1, a SONUS GSX 9000 Gateway 16 is shown which is an IP/PSTN gateway that supports SIP-to-PRI signaling and RTP-to-TDM media stream between the IP network and the PSTN. The local network services (LNS) switch 34 shown in FIG. 1 can advantageously support what is known in the art as AT&T PrimePlex Service. Calls from the PSTN to VoIP service subscribers (such as the called party referred to herein) are routed over the PSTN to the LNS switch and terminated over the PRI facility from the LNS switch to the gateway. The gateway uses National ISDN-2 PRI signaling to set up the call to the LNS End Office. The LNS End Office sets up the call to the switched network (4ESS) or other Independent local Exchange Carrier (ILEC) 36 switch using SS7 signaling. The LNS end office also receives calls from the PSTN and directs them to the appropriate PRI facility from the LNS end office to the gateway.

Features of the present invention are implemented in application server(s) 22 in the VoIP platform 18. The service logic necessary to implement the features resides in the application servers while routing and policy information is stored in additional servers that support the capabilities of the application servers.

For example, in one embodiment, the platform 18 shown in FIG. 1 has a number of application servers which can support conventional Class 5 and CLASS features in conjunction with the terminal adaptor 30. The TA receives a dial plan from the at least one application server 22 and notifies the application server 22 when specific digits or signals are received from end device 14 of the called party (who is a VoIP subscriber). For example, the TA notifies the application server 22 when a VoIP service subscriber goes "off-hook" or dials a 10-digit number. Server 22 also directs TA 30 to play specific tones, for example, busy, ringing, and dial tone. The application server 22 can serve as a combination MGCP border element and Class 5 feature application server. Services can be subscribed at either the Directory Number (DN) or Service Group (SG) level. A Service Group is a set of Support for collecting keypad presses and phone set hook actions is provided by the terminal adaptor and its implementation of MGCP. Similarly, to control the generation of tones, the application server 22 can use MGCP to communicate with the terminal adaptor 30. The policy servers 24 are illustratively Sonus PSX 6000 servers which provide routing and policy information to the application server(s) 22 and the gateway 16. The policy server 24 also supports the blocking capabilities used by the application server 22. The application server 22 can query the policy server 24 to determine message routing. The policy server 24 can act much like a Call Control Element, determining if and when the call should be routed to a gateway 16 to access the PSTN. The policy server 24 also determines that the application server 22 should process the call. The application server 22 implements the feature of add callers and transfer devices in the VoIP Platform as will be discussed in greater detail below. The server 22 also caches VoIP subscriber data used for providing conventional features such as Caller ID, Call Waiting, Call Forwarding, and 3-Way Calling. Persistent VoIP subscriber and feature data can be stored in an Access Directory Server (ADS) and pushed into the application server cache. Once the final call destination is determined (via a query to the policy server), the application server can use MGCP signaling to a TA (for an on-net termination) or SIP signaling to the gateway (for an off-net termination). A record keeping server can also be provided, such as a Sonus Data Stream Integrator (DSI) (not shown), which is capable of capturing call detail records from the other network elements and transforming them into billing system input format, e.g. AMA records.

In accordance with an embodiment of an aspect of the invention, a number of advanced application servers 22, (which are alternatively referred to herein as "VPLUS" servers) are provided which provide the service logic for the advanced features of the VoIP platform. For example, the advanced application servers can be Sun Fire 280R servers with custom service feature software. It is preferable to build the service logic in composable software modules called "feature boxes." See U.S. Pat. Nos. 6,160,883 and 6,404,878, entitled "TELECOMMUNICATIONS NETWORK SYSTEM AND METHOD," which are incorporated by reference herein. These feature boxes are invoked for calls involving VoIP subscribers on the core advanced application server whenever a call is placed by or to them. Features can be subscribed to at the DN level. However, it is also advantageous to allow features to be subscribed to by "address patterns." Address Patterns allow the bulk subscription of features to a set of addresses. See co-pending, commonly assigned U.S. Utility patent application Ser. No. 09/644,128, entitled "ROUTING EXTENSIONS FOR TELECOMMUNICATIONS NETWORK SYSTEM AND METHOD," filed on Aug. 23, 2000, the contents of which are incorporated by reference herein. When the features require other resources to perform their service logic, they can invoke capabilities on other parts of the platform: such as a media server and a media bridge. The media server, for example, can be a server that supports VoiceXML and can be used whenever IVR like interaction is required with the VoIP subscriber. That is, whenever voice announcements are to be played or touchtone digits are to be collected, the VoiceXML media server capabilities can be requested by one or more feature boxes in the application server. As part of the invocation of the VoiceXML server, the feature boxes indicate where the appropriate scripts are to be found to direct the specific interaction with the user. Similarly, whenever audio needs to be bridged between more than two parties, the feature boxes involved will reroute the audio media to the media bridge so that the media can be mixed and redistributed to the parties involved. See co-pending, commonly assigned U.S. Utility patent application Ser. No. 09/716,102, entitled "SIGNALING/MEDIA SEPARATION FOR TELECOMMUNICATIONS NETWORK SYSTEM, filed on Nov. 17, 2000, the contents of which are incorporated by reference herein.

In accordance with an embodiment of another aspect of the invention, the features offered by the advanced application server are desirably invoked or controlled by means of touchtone key presses on the keypad of a phone. These key presses normally generate DTMF tones. For any call where advanced services are available to VoIP subscribers, the advanced application server can monitor for touchtones from the VoIP subscriber. The advanced application server never need modify in any way the touchtone digits that it detects. That is, it does not need to remove them from the media stream; it can merely recognize them in the media stream. So, for example, if a VoIP subscriber presses a wake up sequence, for example, '*' on the keypad, any and all other people on the telephone call at that time will also hear the DTMF tones associated with '*'. When the VoIP subscriber is interacting with the Phone Feature Manager (as described further herein) or the mid-call IVR dialog, the VoIP subscriber is interacting directly with the advanced application server and all other parties on any active calls are on placed on hold. The parties on hold hear nothing of the interaction of the VoIP subscriber with the IVR dialog. That is, they do not hear touchtones entered by the VoIP subscriber nor do they hear any advanced application server announcements.

VoIP subscriber information (including profile information provisioned by the called party regarding whether to store and/or send call information to the called party to a specified address) can reside in a relational database controlled by software on the core server. Feature boxes can query and change subscriber data using an interface to a software component of the core server. It is advantageous to permit VoIP subscribers to individually enable and disable some features using several methods. For the advanced services, VoIP subscribers can enable some of them and disable some of them using either an interactive voice dialog with the Phone Feature Manager or by accessing the trial website and filling out forms there.

Figure 3:
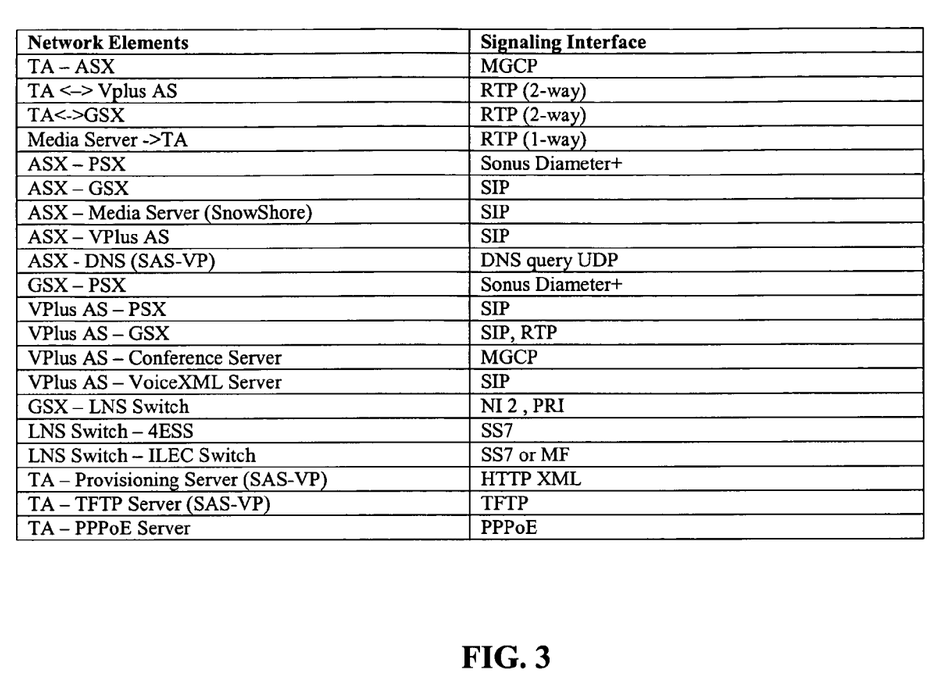
FIG. 3 is an illustrated listing of signaling interfaces between components in one embodiment of a system of the present invention.

FIG. 3 sets forth an illustrative list of signaling interfaces between the components of the service architecture. The embodiment of the present invention herein is described with particular reference to the Internet Protocol (IP) and IP-based protocols such as the Session Initiation Protocol (SIP) and the Real Time Protocol (RTP). It should be noted although that the present invention is not so limited and may be readily extended by one of ordinary skill in the art to different packet-switched protocol schemes.

Provisioning

The VoIP subscriber (e.g., the called party) is assigned a new 10-digit NANP number. The number assigned to the VoIP subscriber is provisioned in the PSTN at the time the PrimePlex telephony service is provisioned from the LNS switch to the gateway. The number is active in the PSTN at that time and will route to the policy and application servers. If the TN has not yet been assigned to a particular VoIP subscriber, (e.g., the called party), the calling parties will hear an announcement that the TN is not a working number. The Phone Feature Manager (also used by Voice Mail) and Personal Conferencing will each have one TN assigned per NPA. These two numbers per NPA will be provided to all users with VoIP TNs within that NPA. The VoIP subscriber's existing IP address associated with their broadband service is the IP address associated with the VoIP subscriber. In addition, the VoIP subscriber can be assigned a Fully Qualified Domain Name (FQDN) using any advantageous format, e.g. such as TNnpanxxxxxx.service.att.com. For calls from the VoIP subscriber TN, all calls can be dialed as 1+NPA-NXX-XXXX. The gateway (as instructed by the policy server) will signal the appropriate dialing plan for the originating PRI facility and the called party number combination to the LNS switch.

In accordance with another aspect of the invention, it is preferable to provide the VoIP subscribers with mechanisms for self-provisioning service features. For example and without limitation, subscribers can be provided with a website portal in conjunction with the advanced application server. It is advantageous to provide a web server to provide a customer website where subscribers go to accomplish three broad sets of tasks: (1) Signing up for service and retrieving account information; (2) Provisioning of advanced services; and (3) Invocation of advanced services. It is also advantageous to provide an HTTP proxy in front of the web server, primarily to provide failover capability in the event that the primary web server fails. The proxy server is the place where HTTP requests first arrive from the subscribers' web browsers. The server then proxies these HTTP requests to the currently active web server.

Alternatively or as a supplemental mechanism to the website portal, a phone feature manager can be provided. The Phone Feature Manager provides VoIP subscribers a telephone number to dial to control their services (as an alternative to the VoIP Web Portal). By calling the Phone Feature Manager, a VoIP subscriber can provision advanced services, retrieve voicemail, return calls to callers who left voicemail, and for whom a return calling number is available, change outgoing message for voicemail, activate/deactivate different services/features, call a speed dial number, call an arbitrary (non-international) number, etc. The Phone Feature Manager can be reached by dialing a speed dial code (e.g., 2-8-8-0-#) from the VoIP device, or by calling one of a service specified set of 10-digit numbers from any phone. The VoIP subscriber can configure auto-login capability for calls placed to the Phone Feature Manager from specified telephone numbers. The options for each telephone number are, for example: (a) Login with VoIP subscriber number and PIN from this telephone number (for TNs unknown to the service); (b) Login with PIN only from this telephone number; or (c) Auto-login from this telephone number (where neither VoIP TN nor PIN is required). For the purposes of announcements and the pre-population of some auto-login numbers, some VoIP subscriber information is gathered from the VoIP subscriber data provided at time of service sign up. There need be no limits imposed on the number of users who can access the Phone Feature Manager using the same VoIP subscriber TN. No login steps are required for calls to the Phone Feature Manager from the phone connected to the VoIP device. When a VoIP subscriber places calls through the Phone Feature Manager, all of the activated VoIP subscriber features can be made active, and the caller ID presented can be the VoIP subscriber's number, regardless of which device was used to access the Phone Feature Manager.

Call Flow

The TA opens a signaling path with the control logic located in the VoIP platform. The control logic provides the IP address of the destination to the TA and the TA establishes a media path to the endpoint. For calls to other VoIP subscribers, this media path may be to a VoIP subscriber on the same broadband network or a VoIP subscriber on another broadband network. In the latter case, if the two broadband networks use different broadband providers that peer with each other, the traffic will not traverse the backbone network. In the unlikely case where the two providers do not peer with each other but do peer with the backbone network, then the traffic will traverse the backbone network. The connection between the backbone network and the VoIP platform should accommodate all signaling traffic and all single-point off-net media traffic. Where additional enhanced features are provided by the advanced application server(s), it is advantageous for all media to route through the VoIP platform, including calls to both PSTN users and VoIP subscribers. Calls to VoIP subscribers should account for the media stream to the advanced application servers and the media stream from the advanced application servers.

The following flow describes an illustrative call from a VoIP subscriber to a number served by the PSTN.

1) The TA is assumed to have registered with the Class 5 Application Server (ASX) and obtained an IP address. The application server instructs the TA to notify the application server should the PSTN end user go off hook.

2) The end user goes off hook, the application server is notified and instructs the TA to play dial tone.

3) The end user dials a 1+10-digit number. This is independent of whether this is a local or LD call.

4) The TA sends the dialed digits to the application server.

5) The application server processes the digits, querying the policy server to determine that the call is permissible and that it is an off-net call. The policy server provides the appropriate PSTN gateway to the application server.

6) The application server sends a call setup message to the gateway requesting call setup. A two-way RTP stream between the TA and the gateway is established.

7) The gateway queries the policy server to determine the route for the call. Upon receiving the policy server response, the gateway sends a call setup request over the PRI facility to the LNS switch. The setup request includes the end user's TN.

8) The LNS switch uses the rate center associated with the PRI facility and the called party number to route the call to the PSTN. The end user's TN is included in subsequent call setup signaling as the Calling Party Number.

9) When the PSTN switch applies ringing to the called party, the terminating switch plays ringing in the backward direction to the calling party.

10) When the called party answers a two-way bearer path is established and the stable call proceeds.

Figure 4:
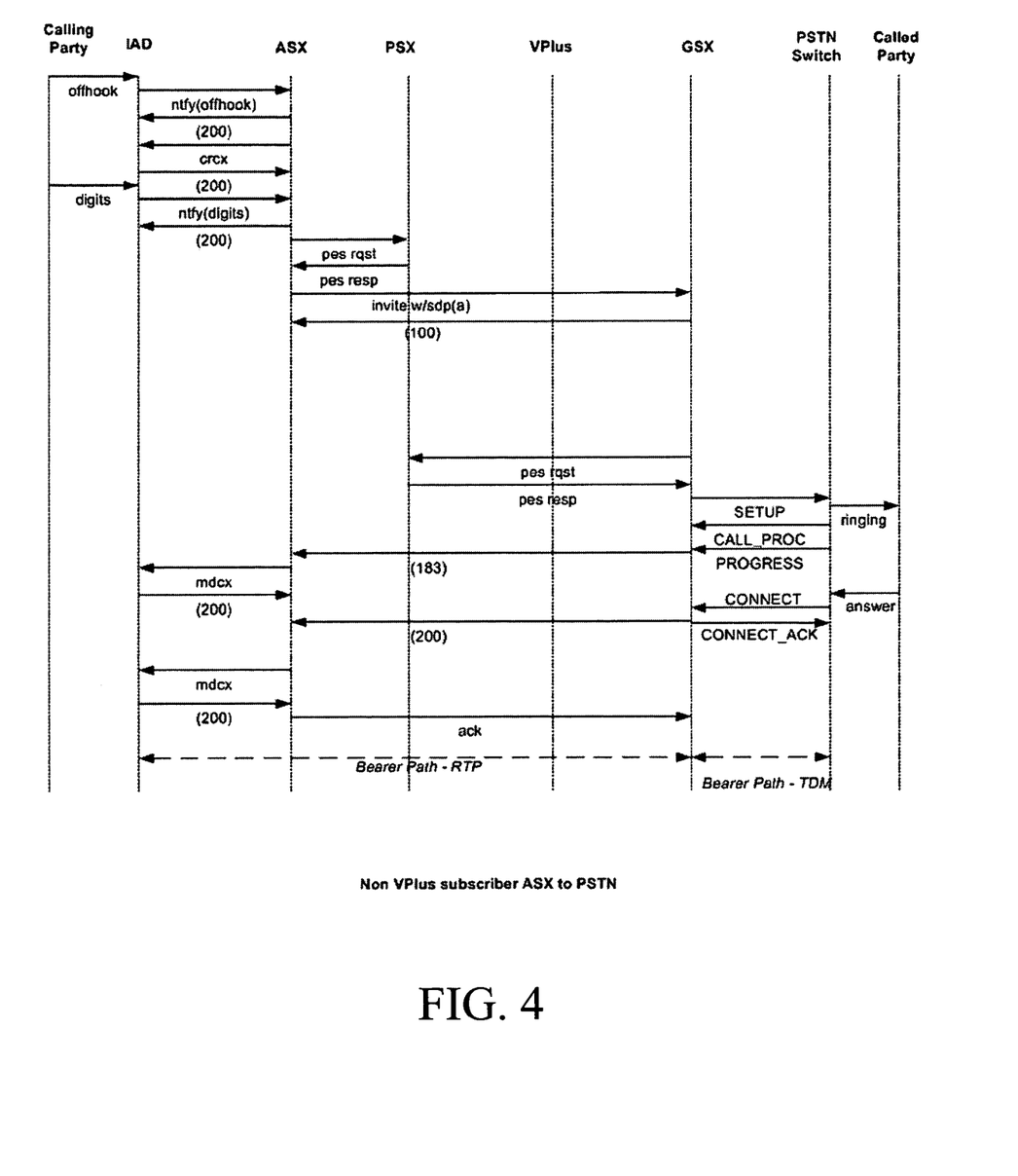
FIG. 4 sets forth an example of signaling flow representing call set up for a call form a VoIP subscriber to an end user accessible on the PSTN network according to one embodiment of the present invention.

FIG. 4 sets forth an example signaling flow representing call setup signaling for a call from a VoIP subscriber to an end user accessible on the PSTN network.

The following flow describes an illustrative call from a PSTN user to a VoIP subscriber, where the two parties are in the same rate center. This example includes Caller ID.

1) The Calling Party may dial a 7- or 10-digit number, depending on the local dialing plan.

2) The ILEC switch determines that the call is permitted and routes the call to the LNS switch.

3) The LNS switch determines that the number is part of PrimePlex service terminating on the gateway. The LNS switch sends a call setup request over the PRI to the gateway.

4) The gateway queries the policy server to determine the route for the call and the policy server responds that the call should be routed to the application server.

5) The gateway sends a call setup message to the application server.

6) The application server queries the policy server to determine the route for the call and the policy server responds that the call should be routed by the application server.

7) The application server determines that the call receives Caller ID and sends a call setup request and the Caller ID to the TA.

8) The TA rings the telephone and provides the Caller ID to the caller ID equipment.

9) The VoIP subscriber answers and the bearer path is established.

Figure 5:
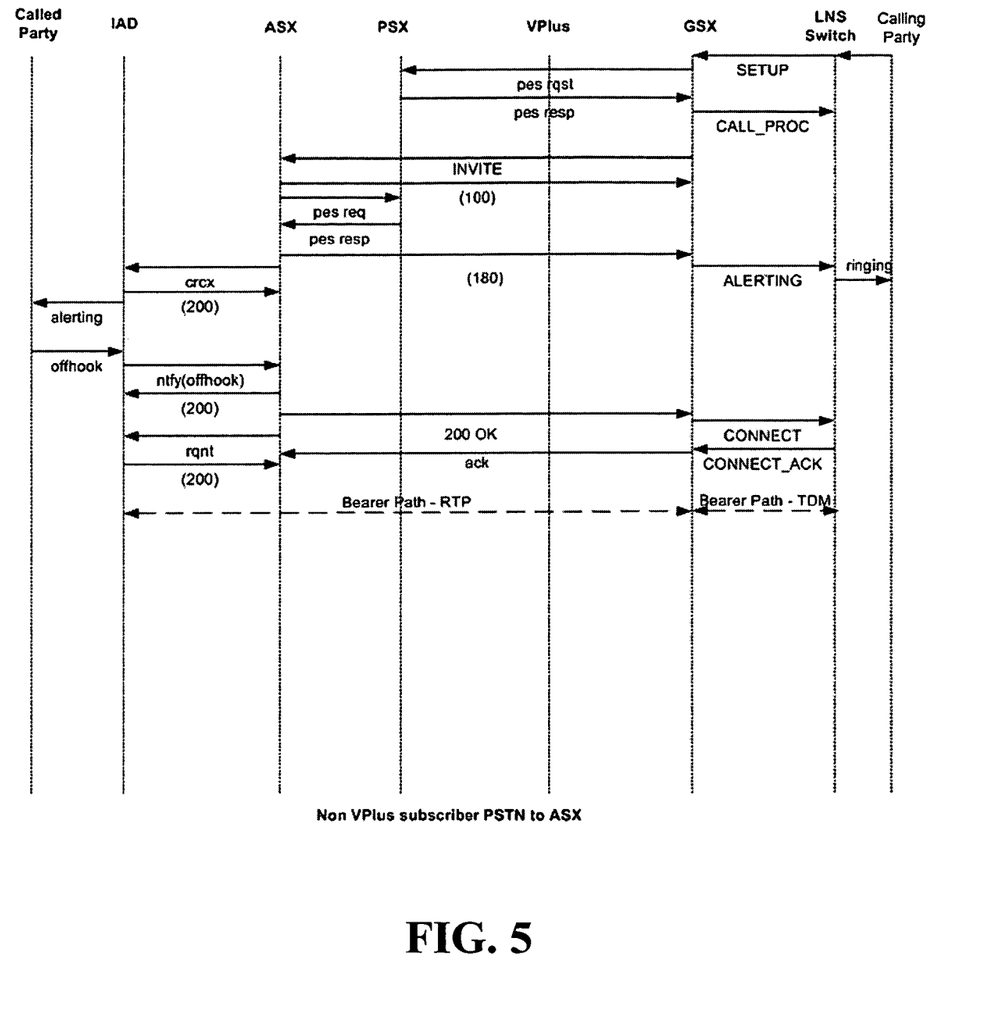
FIG. 5 sets forth an example of signaling flow representing call setup signaling for a call from a PSTN end user to a VoIP subscriber according to one embodiment of the present invention.

FIG. 5 sets forth an example signaling flow representing call setup signaling for a call from a PSTN end user to a VoIP subscriber.

"Add Callers" Service Feature

In accordance with one embodiment of the present invention, an integrated enhanced call feature is provided which is referred to as "Add Callers." "Add Callers" is a mechanism for adding up to some number of additional parties to an existing active call between at least two parties. The number of additional parties to be added is a predeterminal provided by the subscriber. Thus, "Add Callers" allows for a call of up to a predetermined number of people total including the subscriber. It is noted that the subscriber and the additional parties may either belong to the same service provider or a different service provider.

When the subscriber is on an active two party call, the subscriber invokes the "Add Calls" feature mid-call by pressing preferably a wake-up sequence (preferably 3 stars on the touchtone keypad), pressed in rapid succession (e.g., interdigit timeout of 500 msec). A distinctive sequence of touchtones is used to minimize the possibility of accidental engagement during sessions with far-party IVR systems. It is preferable to use one wake-up sequence for all such features, and the ensuing IVR dialog allows the subscriber to select the desired feature to apply. The subscriber then engages an IVR dialog to dial another party, while the existing call is placed on hold. Experienced users can barge through the IVR dialog. Desirably, when the subscriber is ready to bring the new party into the existing call, the subscriber uses the wake-up sequence once. Upon doing so, the subscriber is given two options: 1. drop the new party, 2. add the new party to the existing call. Far parties can drop from the call at any time by simply hanging up; however when the subscriber drops, the entire call is dropped. The subscriber cannot drop individual parties once they have been joined to the call.

The following is an illustrative call flow for this service feature, in accordance with a preferred embodiment of this aspect of the invention:

1. The subscriber makes or receives a call, and the call is answered.

2. The subscriber presses the wake-up sequence (*). Far parties on the call hear the wake-up sequence (*).

3. Following the wake-up sequence (***), the other party or parties on the call hear silence. If multiple TNs are on hold, they can still hear each other.

4. The subscriber engages an IVR dialog to select "Add Callers" and then to dial another party. It is advantageous to allow the subscriber to barge through the IVR dialog.

5. If the new TN is busy, the subscriber should drop this TN (To do this, the Subscriber can press the wake-up sequence (***), then use the IVR dialog to select "Add Callers" and then drop the new call leg.).

6. If the new TN is answered (by a person, answering machine, voicemail, or some network announcements), the subscriber can decide whether or not to join this TN to the call. If the subscriber wants to join this TN to the call, the subscriber uses the wake-up sequence (*), then uses the IVR dialog to select "Add Callers" and then join the new call leg. The TN is joined to the call, and all parties can hear each other. If the subscriber wants to drop this TN, the subscriber drops this TN (To do this, the subscriber presses the wake-up sequence (*), then uses the IVR dialog to select "Add Callers" and then drop the new call leg.).

7. If the new TN phone rings, but is not answered, the subscriber should drop this TN (To do this, the subscriber presses the wake-up sequence (***), then uses the IVR dialog to select "Add Callers" and then drop the new call leg.).

8. If the new TN phone rings, but is not answered, and a network announcement plays, the subscriber should drop this TN (To do this, the subscriber presses the wake-up sequence (***), then uses the IVR dialog to select "Add Callers" and then drop the new call leg.).

9. Steps 2 to 8 may be repeated by any VoIP TN on the call to add more TNs to the call.

10. If the subscriber tries to add more than the maximum telephone numbers to the call, the subscriber can be informed of that by the IVR or simply not be prompted to add another party.

11. Far parties may drop from the call at any time.

12. When the Subscriber drops the call, the entire call ends.

"Transfer Devices" Service Feature

In accordance with another embodiment of the invention, an enhanced call feature is provided which is referred to as "Transfer Devices." "Transfer Devices" is a feature that provides subscribers the ability to move a call-in-progress to another device (phone number) of the subscriber, whether the subscriber was the original calling or called party. It is noted that the devices of the subscriber may either belong to the same service provider or a different service provider.

While the subscriber has a call-in-progress, the subscriber invokes the feature "Transfer Devices" mid-call by pressing the preferably wake-up sequence, as described above. The subscriber then engages an IVR dialog to choose one of several preset locations, or to indicate a new number to which the call should be moved. Experienced users can barge through the IVR dialog. Subscribers are returned to the existing call, and the new device is alerted. When it is answered, a temporary three-way call is set up between the far party, the subscriber's existing device, and the new device. The subscriber can confirm the move by hanging up the existing device, or cancel the move via the wake-up sequence from the original device. In either case, the call reverts to a two-party call, and the feature is available for subsequent moves. Preset locations, and labels for those locations, can be provisioned by the subscriber at the VoIP end-user website.

The following is an illustrative call flow for this service feature, in accordance with a preferred embodiment of this aspect of the invention:

1. The subscriber may or may not choose to provision up to a set number of pre-set locations for the service, for example by using a web browser to access the VoIP Web Portal and provision the preset locations. These preset locations can be specific to the feature.

2. The subscriber makes or receives a call and the call is answered.

3. The subscriber presses the wake-up sequence (*). The far party on the call hears the wake-up sequence (*).

4. Following the wake-up sequence (***), the other party on the call hears silence until the subscriber returns to the call.

5. The subscriber engages an IVR dialog to select "Transfer Device" and then selects a preset location or a new TN for the "Transfer Devices" feature. The preset location or the new TN may be either accessible through the VoIP service or through the PSTN. It is advantageous if the subscriber is allowed to barge through the IVR dialog.

6. If the subscriber makes no selection, the subscriber is returned to the existing call.

7. If the subscriber selects a preset location or new TN, the subscriber is returned to the existing call and the new TN is contacted.

8. If the new TN is busy, it is advantageous that the subscriber does not hear busy, but rather hears silence for a short time. The "Transfer Devices" feature deactivates and the subscriber and the far party hear no ringing and are reconnected.

9. If the new TN is answered (by a person, answering machine, voicemail, or some network announcements), a 3-way call is set up among the subscriber, the far party, and the new TN and all parties can hear each other. If no action is taken, the 3-way call continues. If the far party hangs up, the 2 parties continue on the call. If the new TN hangs up, the other 2 parties continue on the call. If the subscriber wishes to cancel the move (e.g., new TN answered by voicemail or some network announcement), the subscriber enters the wake-up sequence (***), then uses the IVR dialog to select "Transfer Devices" and then cancel the move.

10. If the subscriber wishes to complete the move, the subscriber hangs up their VoIP TN and the VoIP TN is dropped from the call. The original VoIP TN can then make and receive new calls.

11. If the new TN phone rings, but is not answered, the subscriber should drop this TN (To do this, the subscriber presses the wake-up sequence (***), then uses the IVR dialog to select "Transfer Devices" and then drop the new call leg.).

12. If the new TN phone rings, but is not answered, and a network announcement plays, the subscriber drop this TN (To do this, the subscriber presses the VPlus wake-up sequence (***), then uses the IVR dialog to select "Transfer Devices" and then drop the new call leg.).

13. Steps 3 to 12 may be repeated by any VoIP subscriber on the call.

The foregoing description is to be understood as being in every respect illustrative and exemplary, but not restrictive, and the scope of the invention disclosed herein is not to be determined from the description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description describes an embodiment of the invention with particular reference to a VoIP service architecture. However, the principles of the present invention could be readily extended to other network service architectures. Such an extension could be readily implemented by one of ordinary skill in the art given the above disclosure.

What is claimed is:

1. A method for managing calls for a subscriber comprising:

accessing a calling plan while the subscriber is in an existing active call with at least one other party, wherein said call is placed or received by the subscriber at a first device;

invoking at least one service feature of the calling plan from an interactive voice response (IVR) dialog during the active call, wherein said feature includes:
an add callers feature for adding at least one additional party to the existing active call between the subscriber and the other party; and
a transfer devices feature for transferring the existing active call to at least one additional device of the subscriber and hanging up on the first device by the subscriber to confirm the transfer of the call to the additional device.

2. The method of claim 1 wherein said add callers feature further comprises:
alerting a device of the additional party to be included in the existing active call.

3. The method of claim 1 wherein said add callers feature further comprises:
connecting the subscriber to the additional party to form a new call leg.

4. The method of claim 3, wherein said add callers feature further comprises:
dropping the new call leg by the subscriber.

5. The method of claim 4 wherein said new call leg is dropped when the additional party does not answer.

6. The method of claim 4 wherein said new call leg is dropped when the additional party is busy.

7. The method of claim 1 wherein said additional parties in the add callers feature is a predetermined number.

8. The method of claim 1 wherein said transfer devices feature further comprises:
alerting the additional device of the existing call.

9. The method of claim 1 wherein said transfer devices feature further comprises:
connecting the subscriber to the additional device to form a new call leg.

10. The method of claim 9 wherein said transfer device feature further comprises:
dropping the new call leg by the subscriber at the first device.

11. The method of claim 10 wherein said new call leg is dropped when the additional device does not answer.

12. The method of claim 10 wherein said new call leg is dropped when the additional device is busy.

13. The method of claim 1 wherein said additional devices of the subscriber are predetermined by the subscriber.

14. The method of claim 1 wherein said additional device of the subscriber is provided by the subscriber upon the invoking of the transfer device feature.

15. A method for managing calls for a subscriber comprising:
accessing a calling plan while the subscriber is in an existing active call with at least one other party, wherein said call is placed or received by the subscriber at a first device and said subscriber belongs to a first service provider; and
invoking at least one service feature of the calling plan from an interactive voice response (IVR) dialog during the active call using at least one of key press commands and voice commands, wherein said service feature includes:
an add callers feature for adding at least one additional party to the existing active call between the subscriber and the other party, said additional party belongs to a second service provider.

16. A method for managing calls for a subscriber comprising:
accessing a calling plan while the subscriber is in an existing active call with at least one other party, wherein said call is placed or received by the subscriber at a first device and said first device of the subscriber belongs to a first service provider; and
invoking at least one service feature of the calling plan from an interactive voice response (IVR) dialog during the active call using at least one of key press commands and voice commands, wherein said service feature includes:
a transfer devices feature for transferring the existing active call to at least one additional device of the subscriber and hanging up on the first device by the subscriber to confirm the transfer of the call to the additional device, said additional device of the subscriber belongs to a second service provider.

17. A system for managing calls for a subscriber comprising:
an internet protocol network connected to a first device of the subscriber wherein a call is placed or received by the subscriber at said first device;
at least one gateway connected to at least one other party; and
at least one platform including said gateway and an application server with an interactive voice response (IVR) dialog feature, said platform connected to said internet protocol network for accessing a calling plan with at least one service feature via said IVR dialog feature, while the subscriber is in an existing active call with said at least one other party, wherein said service feature includes:
an add callers feature for adding at least one additional party to the existing active call between the subscriber and the other party; and
a transfer devices feature for transferring the existing active call to a at least one additional device of the subscriber and hanging up on the first device by the subscriber to confirm the transfer of the call to the additional device.

18. The system of claim 17 wherein the gateway is connected to a device of the additional party to alert said device of the existing active call and further connecting the subscriber to the additional party to form a new call leg.

19. The system of claim 17 wherein the internet protocol network is connected to said additional device of the subscriber to alert said additional device of the existing active call and further connecting the subscriber to the additional device to form a new call leg.

20. The system of claim 17 wherein said platform includes a database for storing the calling plan with said service feature.

21. The system of claim 17 wherein said platform includes at least one server connected via a high speed local network using Ethernet switches, routes, a combination thereof to provide access and networking to the internet protocol network.

22. The system of claim 17 wherein said internet protocol network is connected to the first and the additional devices of the subscriber via a broadband access network provided through a cable or digital subscriber line modem.

23. A system for managing calls for a subscriber comprising:
an internet protocol network connected to a first device of the subscriber wherein a call is placed or received by the subscriber at said first device and said subscriber belongs to a first service provider;
at least one gateway connected to at least one other party;

at least one platform including said gateway and an application server with an interactive voice response (IVR) dialog feature, said platform connected to said internet protocol network for accessing a calling plan with at least one service feature via said IVR dialog feature, while the subscriber is in an existing active call with said at least one other party;

wherein said service feature includes:

an add callers feature for adding at least one additional party to the existing active call between the subscriber and the other party, said additional party belonging to a second service provider.

24. A system for managing calls for a subscriber comprising:

an internet protocol network connected to a first device of the subscriber wherein a call is placed or received by the subscriber at said first device and said first device belongs to a first service provider;

at least one gateway connected to at least one other party;

at least one platform including said gateway and an application server with an interactive voice response (IVR) dialog feature, said platform connected to said internet protocol network for accessing a calling plan with at least one service feature via said IVR dialog feature, while the subscriber is in an existing active call with said at least one other party wherein said service feature includes:

a transfer devices feature for transferring the existing active call to at least one additional device of the subscriber and hanging up on the first device by the subscriber to confirm the transfer of the call to the additional device, said additional device of the subscriber belonging to a second service provider.

* * * * *